UNITED STATES PATENT OFFICE.

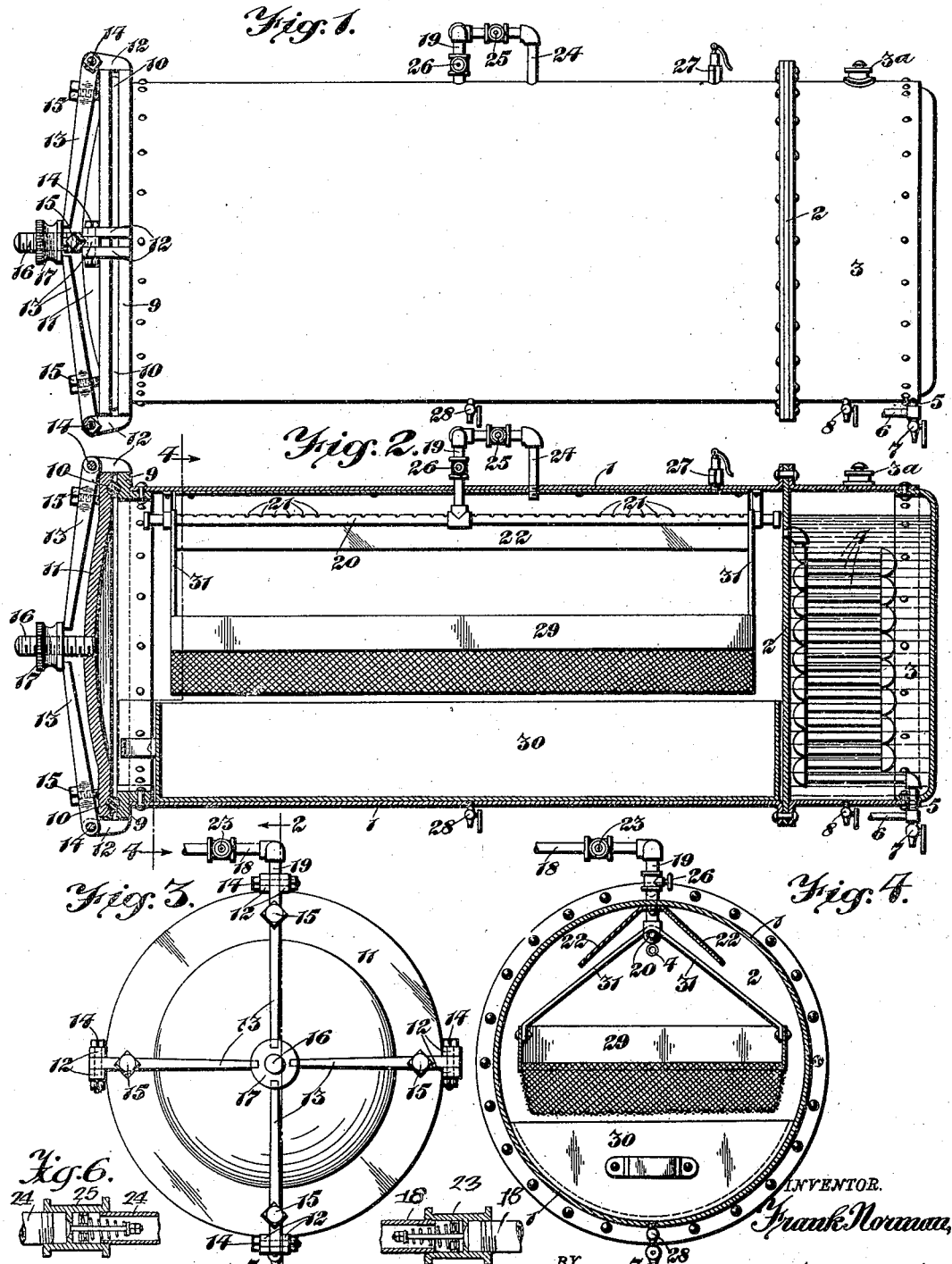

FRANK NORMAN, OF DES MOINES, IOWA, ASSIGNOR OF EIGHT THIRTY-SECONDS TO DOUGLAS J. LANDERS, SEVEN THIRTY-SECONDS TO WILLIAM A. McATEE, FOUR THIRTY-SECONDS TO ALPHONSO B. LOVAN, TWO THIRTY-SECONDS TO GEORGE W. YOUNG, AND ONE THIRTY-SECOND TO WILLIAM T. SHORES, ALL OF SPRINGFIELD, OHIO, AND TWO THIRTY-SECONDS TO CLARENCE H. NICHOLS, OF NEW YORK, N. Y.

ACETYLENE-GAS GENERATOR.

1,242,584.  Specification of Letters Patent.  Patented Oct. 9, 1917.

Application filed June 24, 1916. Serial No. 105,607.

*To all whom it may concern:*

Be it known that I, FRANK NORMAN, a citizen of the United States, residing at the city of Des Moines, county of Polk, and State of Iowa, have invented a new and useful Acetylene-Gas Generator, of which the following is a specification.

This invention relates to acetylene gas generators.

An object of the invention is to provide an acetylene gas generator especially adapted for use in an acetylene gas generating system, combined with the internal combustion engine of an automobile or other vehicle, and arranged so that the gas generated within the generator will be supplied in proper volume and quality to the system communicating with the engine or motor.

Another object of the invention is to provide a generator for an acetylene gas system combined with the engine of an automobile and comprising a tank having a system of water supply and distributing devices, in connection therewith, in proper relation to a movable carbid holder arranged to subject all of the carbid to the action of the water as a result of the movement of the carbid holder, which movement, in the chosen embodiment illustrated, is effected automatically.

Another object of the invention is to provide an improved acetylene gas generator adapted for use in an acetylene gas generating system combined with an internal combustion engine the generator being composed of a tank having water supply and distributing devices therein, a swinging carbid holder within the tank arranged by swinging contact with the walls of the tank to agitate the carbid effectively to subject all of it to the action of the water, and a removable ash pan within the tank for receiving the ashes falling from the carbid holder.

An additional object is to provide an acetylene gas generator of the character described having a passage for withdrawing the gas, arranged in the form of a series of coils of pipe preferably submerged in water and in connection with a service pipe by which the gas is conducted to the point of service.

Other objects will appear from the following description, reference being made to the accompanying drawings, illustrating a preferred embodiment of the invention, in which—

Figure 1 is a side elevation of the acetylene gas generator.

Fig. 2 is a longitudinal vertical sectional view.

Fig. 3 is an end elevation.

Fig. 4 is a cross sectional view on the line 4—4 of Fig. 2.

Fig. 5 is a sectional view illustrating details of the check valve controlling the admission of water into the generating tank.

Fig. 6 is a sectional view illustrating details of the check valve for admitting gas pressure into the supply pipe to cause back pressure of the water against the valve shown in Fig. 5.

The generator comprises a metallic tank or chamber 1 closed at one end by a wall 2 constituting a partition between the generating chamber and the chamber 3 containing water and submerged coils of pipe through which the gas is withdrawn. The water chamber 3 is provided with a water filling passage 3ª and incloses the series of submerged coils of pipe 4, the upper one of which opens into the generating chamber, and the lower one of which has an extension 5 passing through the lower wall of the water chamber and communicating with a service pipe 6, through which the gas is conducted for service. The walls of the water chamber 3 being of large area and in contact with the atmosphere, the water is thereby maintained at a lower temperature than the temperature of the gas when it first enters the pipe 4. The water thereby acts as a cooling agent to reduce the temperature of the gas. The connection between the pipes 5 and 6 is provided with a valve controlled drain outlet 7 for withdrawing any condensation or deposits which accumulate within the pipes. The bottom of the water chamber is also provided with a valve controlled drain outlet 8.

The opposite end of the generating chamber is provided with a strong flanged ring 9 having an annular groove for receiving the packing 10 compressed therein by the pressure of the closure-plate 11 which is also provided with an annular groove for the packing. A series of bracket arms 12 are in rigid connection with the ring 9 and constitute supports for the levers 13 which are supported by pivot bolts 14 passing through the brackets and the levers. Each of the levers is equipped preferably with an adjustable compression member 15 operatively mounted in threaded holes in the levers and having polygonal heads with which any appropriate tool or wrench may be engaged for purposes of adjustment. The inner ends of the members 15 are arranged to engage and bear against the closure-plate 11 at points near the packing, in order to give proper compression as required to close or seal the generating chamber hermetically. When the levers are in operative position they extend radially, as illustrated in Fig. 3, with their inner ends adjacent to the threaded clamp support 16 carried by the closure 11. The clamp support 16 carries a clamp device 17 arranged to engage the ends of the levers 14 and press them toward the closure-plate in order to close or seal the generating chamber hermetically. Thus the levers are pivotally supported by the tank, and the clamp device is supported by the closure and is arranged to coöperate with the levers to hold the closure in position.

The water supply and distributing system includes a supply pipe 18 having an extension 19 passing through the upper wall of the tank 1 and opening into a horizontal spray pipe 20 arranged longitudinally near the top of the generating chamber. The pipe 20 is formed with numerous discharge openings 21 in its upper side, so that the water will be sprayed upwardly and into contact with the oblique spray deflectors 22. The deflectors 22 extend obliquely downwardly and outwardly at opposite sides of the spray pipe 20, so that the water will be equally and uniformly distributed thereby. By this arrangement the water is distributed over a considerable area, so that practically all of the carbid is subjected to the action of the water.

The pipe 18 includes a check valve device 23 which opens under the pressure of the water against the influent side thereof when the pressure of the gas within the tank is below that of the water, and which is automatically closed by the pressure of the gas against the effluent side thereof when such pressure rises above that of the water.

Thus the flow of the water will remain constant until there is an over-supply of gas, and will be automatically stopped by the pressure of the gas as a result of an over-supply thereof. In order to subject the valve device 23 to the pressure of the gas when such pressure rises above the pressure of the water, I provide a passage 24 from the tank to the connection between the pipe 18 and the extension 19. The passage 24 includes a check valve device 25 which is kept closed by the pressure of the water entering the adjacent part of the passage 24 from the pipe 18, so long as the water pressure exceeds that of the gas within the generating chamber, so that none of the water can enter the generating chamber through the passage 24. However, when the pressure of the gas rises above the pressure of the water, that is to say, when the pressure of the gas rises to the predetermined maximum, the check valve device 25 will be opened thereby, thus enabling the gas to enter the pipe 18 and close the valve device 23 and stop the flow of the water into the generating chamber. It will be understood that the moment the pressure of the gas is brought below the pressure of the water, the flow of the water will be resumed. In this way the supply of the water is regulated automatically and requires no consideration or attention by the operator.

The extension 19 of the water pipe is provided with a manipulative valve 26 which can be opened and closed at will, so that when no gas is needed the water supply pipe can be permanently closed.

The generating chamber is provided with a safety valve 27 for relieving automatically excessive pressure therein, and is also provided with a valve controlled drain outlet 28 for withdrawing any accumulations of water from the generating chamber.

The swinging carbid holder 29 has its bottom in the form of a screen or grate so that the ashes can drop into the removable ash pan 30. The carbid holder is provided with straps or bails 31 extending over the spray pipe 20 so that the holder 29 is free to swing as the generator is shaken or vibrated by the travel of the vehicle upon which it is mounted, or otherwise. By the swinging of the carbid holder into contact with the walls of the tank, the carbid will be thoroughly shaken and agitated so that all of it will be subjected to the water sprayed from the pipe 20 and distributed by the spray deflectors 22. The vibration also results in shaking the ashes through the bottom of the holder into the ash pan 30, and these desirable results attained in this efficient manner are important features of the invention.

It will be understood that the construction and arrangement of the parts may be modified in various particulars without departing in the least from the principles of the invention.

What I claim and desire to secure by Letters Patent of the United States, is:—

1. An acetylene gas generator, comprising a generator tank adapted to contain carbid, a water supply pipe opening into the tank, a check valve in the water supply pipe arranged to open under pressure of the water against the influent side thereof to admit water into the tank, and to be closed by the back pressure of the gas against the effluent side thereof to stop the flow of the water through said pipe when the gas pressure in the tank exceeds the pressure of the water against the influent side of said valve, an additional pipe enabling the gas to enter the water supply pipe between said check valve and the tank to cause back pressure against the effluent side of said valve, and a valve in said additional pipe which is closed when the water is flowing through the supply pipe and which opens by the pressure of the gas when that exceeds the water pressure to enable the gas to pass said valve and cause back pressure in the supply pipe against the effluent side of said check valve.

2. An acetylene gas generator, comprising a generating tank, a carbid holder supported in the tank, a water supply pipe extending into the tank, a spray pipe in the tank longitudinally above the carbid holder receiving water from the supply pipe, and having spray passages at intervals throughout its length, a valve in the water supply pipe arranged to open under the pressure of the water against the influent side thereof to admit water into the spray pipe and to be closed by the back pressure of the gas against the effluent side thereof to stop the flow of water when the pressure of the gas in the tank exceeds the pressure of the water against the influent side of the valve, an additional pipe enabling the gas to enter the water supply pipe between said spray pipe and said valve to cause back pressure against the effluent side of said valve, and means in the additional pipe preventing passage of water therethrough into the tank.

3. An acetylene gas generator, comprising a generating tank, a carbid holder in the tank, a water supply pipe extending into the tank, a water spray pipe in the tank receiving water from the supply pipe, a check valve in the supply pipe arranged to open under the pressure of the water against the influent side thereof to admit water into the spray pipe and to be closed by back pressure of the gas against the effluent side thereof when the gas pressure in the tank exceeds the pressure required to open said valve, a gas pipe from the tank enabling the gas pressure to cause back pressure in the supply pipe against the effluent side of said valve, a valve in the gas pipe which is closed when the water is flowing through the supply pipe and which opens by the pressure of the gas when that exceeds the water pressure as required to enable the gas to pass said valve and cause back pressure in the supply pipe against the effluent side of said check valve.

4. An acetylene gas generator, comprising a generating tank, a carbid holder in the tank, a water supply pipe extending into the tank, a water spray pipe in the tank receiving water from the supply pipe, a check valve in the supply pipe arranged to open under the pressure of the water against the influent side thereof to admit water into the spray pipe and to be closed by back pressure of the gas against the effluent side thereof when the gas pressure in the tank exceeds the pressure required to open said valve, a gas pipe from the tank enabling the gas pressure to cause back pressure in the supply pipe against the effluent side of said valve, a valve in the gas pipe which is closed when the water is flowing through the supply pipe and which opens by the pressure of the gas when that exceeds the water pressure as required to enable the gas to pass said valve and cause back pressure in the supply pipe against the effluent side of said check valve, and a manipulative device for closing said supply pipe independently of the gas pressure.

5. An acetylene gas generator, comprising a generating tank, a water supply pipe opening into the tank, a check valve in the supply pipe arranged to open under the pressure of the water against the influent side thereof to admit water into the tank, and to be closed by back pressure of the gas against the effluent side thereof when the gas pressure in the tank exceeds the pressure required to open said valve, a gas pipe from the tank enabling the gas to cause back pressure in the supply pipe against the effluent side of said valve, a valve in the gas pipe which is closed when the water is flowing through the supply pipe and which is opened by the pressure of the gas when that exceeds the water pressure as required to enable the gas to pass said valve and cause back pressure in the supply pipe against the effluent side of said check valve, a device in the supply pipe between said check valve and the tank adjustable to vary the quantity of water entering the tank, and an outlet passage for the gas from said tank.

6. An acetylene gas generator comprising a tank, a water supply pipe extending into the tank, a spray pipe in the tank receiving water from the supply pipe and having spray outlets through the upper side thereof, a carbid holder suspended from the spray pipe and arranged to swing into contact with opposite sides of the tank to agitate and distribute the carbid, and oblique spray deflectors at opposite sides of said spray pipe for receiving the spray and distributing it over a relatively large area of the carbid.

7. An acetylene gas generator, comprising a tank, a water supply pipe extending into the tank, a spray pipe in the tank receiving water from the supply pipe and having spray outlets through the upper side thereof, a carbid holder within the tank, elements pivotally supporting the carbid holder in the tank and enabling the carbid holder to swing into contact with the opposite sides of the tank and agitate and distribute the carbid, and spray deflectors supported at opposite sides of said spray pipe for receiving the spray and distributing it over a relatively large area of the carbid.

8. An acetylene gas generator, comprising a generating tank, a water supply pipe extending into the tank, a valve controlling said supply pipe, a horizontal spray pipe within the tank receiving the water from the supply pipe and having spray outlets in the upper side thereof, a carbid holder suspended below said spray pipe, spray deflectors extending obliquely downwardly from the top of the tank at opposite sides of the spray pipe for receiving and distributing the spray over a relatively large area of the carbid, and a device for releasing excessive pressure from the tank.

9. An acetylene gas generator, comprising a generating tank, a water supply pipe extending into the tank, a spray pipe in the tank receiving the water from the supply pipe, means for controlling the supply of water from the supply pipe to the spray pipe, a carbid holder in the tank below the spray pipe, elements pivotally supporting the carbid holder, deflectors within the tank above the spray pipe for deflecting the spray over a relatively large area of the carbid, and a valve controlled outlet for withdrawing accumulations of water from said tank.

10. An acetylene gas generator, comprising a generating tank, a water supply pipe extending into said tank, a spray pipe extending longitudinally in the tank receiving water from the supply pipe and having spray outlets through the upper side thereof, a valve controlling admission of water from the supply pipe into the spray pipe, a carbid holder in the tank, elements pivotally supporting said holder and enabling it to swing against the opposite sides of the tank to agitate and distribute the carbid, oblique deflectors supported at opposite sides of said spray pipe for receiving and deflecting the spray over a relatively large area of the carbid, and a pressure release device in connection with said tank for the purpose described.

11. An acetylene gas generator comprising a generating tank, a carbid holder in the tank, a water supply pipe opening into the tank, means for spraying and distributing water from said supply pipe over a relatively large area of the carbid, a manipulative valve in the supply pipe for optionally controlling the flow of water, an automatic valve in the supply pipe arranged to open under the pressure of the water when the water pressure in the supply pipe exceeds the pressure of the gas in the tank, and to close under the pressure of the gas when the gas pressure in the tank exceeds that of the water in the supply pipe, a gas pipe from the tank opening into the supply pipe between the automatic valve and the tank, whereby gas may be admitted into said supply pipe to close said automatic valve, a valve in said gas pipe closed by the pressure of the water when the water pressure in the supply pipe exceeds the pressure of the gas in the tank, and to open under the pressure of the gas when the gas pressure in the tank exceeds that of the water in the pipe, and means for withdrawing the gas from the generating tank.

In witness whereof, I have signed this specification in the presence of two subscribing witnesses.

FRANK NORMAN.

Witnesses:
   CHAS. McKNOLLY,
   GLADYS DAILY.

Copies of this patent may be obtained for five cents each, by addressing the "Commissioner of Patents, Washington, D. C."